Feb. 6, 1968  P. E. CARON ET AL  3,367,820
REINFORCED MOLDABLE WOOD FIBER MAT AND
METHOD OF MAKING THE SAME
Filed Feb. 1, 1963

INVENTORS
PHILIP E. CARON
GILBERT D. ALLEN
BY
ATTORNEYS 3,367,820
REINFORCED MOLDABLE WOOD FIBER MAT
AND METHOD OF MAKING THE SAME
Philip E. Caron and Gilbert D. Allen, Longview, Wash.,
  assignors to Weyerhaeuser Company, Tacoma, Wash.,
  a corporation of Washington
Filed Feb. 1, 1963, Ser. No. 255,442
6 Claims. (Cl. 156—242)

This invention relates to an article of manufacture and a method of producing the same. More specifically, this invention relates to a reinforced moldable wood fiber mat and a method of combining the moldable mat with the reinforcing material.

There are many classes of moldable materials on the market today. One of these classes is manufactured by the Weyerhaeuser Company of Tacoma, Wash., and sold under the trade name of "Press-Tock."

This product generally comprises a quantity of comminuted cellulose material, preferably defiberized lignocellulose. This is mixed with about 10%, preferably about 10% to about 40%, by weight of thermoplastic binder and a thermosetting resin, preferably about 1% to 15% by weight. The resulting molding mixture then is felted into a mat and prepressed to an intermediate compressed moldable fiber mat which has a density of at least about 20 lbs. per cu. ft. This intermediate mat is subjected to the action of steam and other hot aqueous vapors and is molded to a preselected shape.

A variety of comminuted cellulose materials may be used as starting materials in the practice of the present invention. Although suitable materials include sawdust, shavings, wood flour, and various chemically produced cellulose pulps, it is preferred to employ defiberized lignocellulose. This may be derived from any suitable source such as cane, straw, the bark of trees, and the like, but preferably it is derived from the wood of trees of various species.

The resinous binder system as a class used singly or in admixtures with each other are suitable for the purpose of the present invention, the particular binder employed being determined by the properties of the strength, hardness, surface qualities, etc. desired in the molded product. Such materials include, for example, the various grades of asphalt and gilsonite; the thermoplastic cellulose ethers, including ethyl cellulose, benzyl cellulose and the like; the thermoplastic cellulose esters, such as cellulose acetate; the thermoplastic coumarones; the thermoplastic coumaroneindene resins; the thermoplastic polyvinyl resins, including polyvinyl acetate, polyvinyl chloride and co-polymers thereof; the thermoplastic alkyd; the thermoplastic polystyrenes; and rosin. The condensation products of urea and an aldehyde and of a phenol and an aldehyde, for example, the phenol-formaldehyde resins, which at least in the preliminary stages of the pressing operation are thermoplastic in properties, are suitable as the thermosetting resins.

In general, this product is manufactured by the following process:

Step 1.—Selecting sound whole wood for chips.

Step 2.—Defiberizing the chips under carefully controlled conditions. This includes treating the chips with steam under carefully controlled pressure and temperature.

Step 3.—Adding a selected resin binder system to the hot, moist fibers.

Step 4.—Drying the fiber-resin mixture under carefully controlled conditions which includes the humidity under which the drying process is carried out to prevent curing of the thermosetting resin.

Step 5.—Continuously felting the dried fibers into a thick, low density mat.

Step 6.—Pre-densifying the continuous mat to facilitate handling, shipping and conversion.

Step 7.—Cutting the mats into piece sizes required by the converter and the ultimate consumer.

Step 8.—Palletizing the pieces for shipment.

Because this material can be readily molded into various shapes and has relatively high-strength characteristics and a relatively low cost per unit, it has enjoyed substantial commercial success.

However, the molded surfaces of the above product are normally porous with conventional formulations and mottled in color. The porosity and surface variability of the molded parts do not yield uniform painted surfaces without extensive surface filling operations.

In order to cure this defect, it was proposed to mold plastic films onto the surface of the parts to be painted or used. This produced moisture vapor barriers which promotes blistering of the surface. The blistering can be minimized by use of long, complicated molding cycles or controlling the moisture content at low levels. These approaches increased the finishing cost of the product and therefore are generally unsatisfactory.

An object of this invention is to improve the method for finishing the moldable wood fiber parts or mats.

Another object of this invention is to provide a method for finishing moldable wood fiber parts or mats at an acceptable cost.

Another object of this invention is to provide a moldable wood fiber mat or part having increased stability and strength characteristics.

These and other objects and advantages will become clear to those persons skilled in the art when taken in conjunction with the following detailed description and drawings, wherein.

Figure 1:
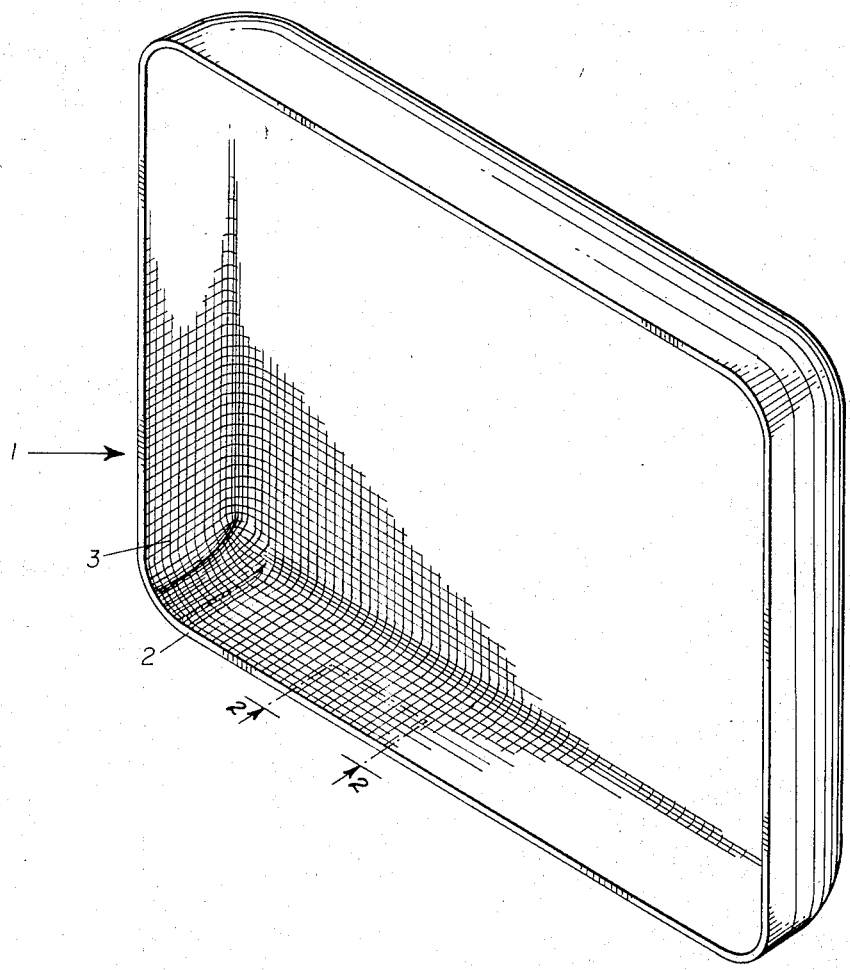
FIGURE 1 is a perspective view of a luggage shell having a reinforcing fiber molded on the interior surface thereof.
Figure 2:
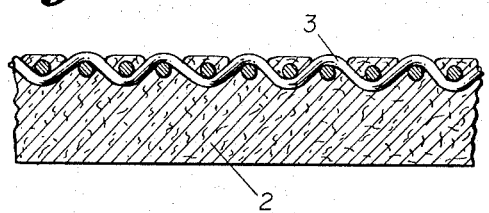
FIGURE 2 is a cross-sectional view taken on line 2—2 of FIGURE 1.

In the art of molding the fiber mats or parts, it is first placed in a preconditioning steam atmosphere. The time needed in the saturating steam is about 5–60 seconds and serves to activate the binder and plasticize the wood fibers. This conditioning action imparts a degree of formability necessary to convert the flat part or mat into a contoured item.

The flexible mat is now removed from the steamer and is placed into a matched metal die. Positioning lugs are normally used to very accurately locate the mat on the die. This positioning of the blank or panel will allow it to be cut to minimum size and the trim losses reduced.

The die with the mat therein is now closed under a pressure of from 200 to 1000 p.s.i. and a temperature of from 150° F. to 375° F. The pressure may be reduced, if desired, to release volatiles and then repressed from 15–180 seconds. The part is now removed and a formed finished article is displayed.

We have discovered that fabrics, untreated or resin treated, can be molded into the surface of the fiber mat during the standard molding cycle as an adequate solution to the finishing problem. The fabrics yielding the best results were various grades of burlap, paper weave fabric, fiberglass and cotton meshes or fabric.

Fair adhesion can be achieved without resin treating the fabric prior to molding. Improved adhesion is obtained through use of resins on the fabric surface. Usable adhesives include: polyvinyl actates, phenolformaldehyde, urea-formaldehyde and melamine-formaldehyde resins. The clear melamine resins are particularly useful on the colored fabrics.

The basic process of this invention comprises: conditioning the fiber mat in the steam chamber from 5–60 seconds, laying the fabric on the fiber mat surface, forming and curing the parts with the same cycle and pressing conditions as though no fabric had been used as noted above in the molding procedure.

Moreover, the process can be altered by preconditioning the fiber mat in the steam chamber, laying fabric or material that is resin treated on the fiber mat surface, forming and curing the part with the same cycle and pressing conditions as though no fabric had been used.

Alternately, the fabric can be placed on the wood fiber mat during the process of manufacture thereof. One of the steps involved in manufacture of this product is predensifying the continuous mat to facilitate handling, shipping and conversion. This is brought about by passing the continuous mat between a pair of rolls spaced one above the other a predetermined distance apart. As the continuous wood fiber mat enters the pair of rolls, a fabric is continuously laid on the mat and pressed therein by the rolls. Thereafter, the moldable wood fiber mat can be molded to any desired shape or contour, as noted above, which bonds the fabric to the finished article. It should be noted that the fabric can be untreated or treated with a resin in this operation.

Also, the above process can be further altered when it is desired to form flat decorative reinforced panels. This is brought about by eliminating the initial steam conditioning of the wood fiber mat. The flat panels are formed by placing a mat of a predetermined size between a pair of heated platens or the like, then placing the reinforcing fabric having a selected color and treated or untreated with a resin adhesive onto the mat and then subjecting the mat and reinforcing fabric to a temperature of from 250 to 400° F. and pressure of from 50 to 1000 p.s.i. for from 1 to 20 minutes to cure the resin binder system. This process will produce a low or medium density rigid finished part with the reinforcing fabric embedded into the surface of the panel.

With the above outlined process, a standard molding cycle is used by the operator. With this cycle in operation, the operator does not have to spend additional time molding the fabric onto the finished contoured wood fiber mat in a separate operation as has been done previously.

The presently described process is illustrated further in the following examples:

*Example I*

A panel of moldable wood fiber mat was first selected having a predetermined size. The burlap having a weight of 10 oz. per sq. yd. was sprayed on one side with an aqueous-alcohol solution of Monsanto's MF-300, melamine resin. The resin was allowed to air dry. The amount of resin used was 10 oz. of solids per sq. yd. Burlap was then cut to the same size as the fiber mat used for the example. The fiber mat was then steamed for 10 seconds and the burlap laid on the surface with the resin side against the fiber mat surface. The fiber mat-burlap assembly was formed at 300° F., 600 p.s.i. and with a total press cycle time of 45 seconds. The high level of resin used permitted bleed-through of the resin onto the outer side of the burlap to form a hard resinous surface. If a softer surface is desired, less resin would be used.

*Example II*

A satisfactory moldable wood fiber mat can be formed using the process noted in Example I but omitting the step of spraying the burlap with resin. In this manner, the burlap is simply pressed into the fiber mat since the steam pressure plasticizes the wood fiber and activates the resin binder in the wood fiber mat.

*Example III*

A fabric surface luggage shell was formed by first selecting a proper size fiber mat. Paper weave with 10 strands per inch was sprayed with 2 grams per sq. yd. of a suitable resin and dried. The fabric was cut to the size of the fiber mat and laid on the mat surface with the resin side against the mat. The fiber mat-fabric assembly was steamed together and formed and cured in the luggage shell die for 45 seconds at 340° F. and 500 p.s.i.

It should be noted that a textured surface is achieved with this process and a selection of color and type of fabric will produce a decorative finish to the surface on which the fabric is molded. The fabrics used must have some looseness of weave. The weight of the burlap used in this invention should be in a range of 7-12 oz. per sq. yd. and preferably about 10½ oz. per sq. yd. A paper weave used should have from 8-14 strands per inch and a weight from 0.35 to 0.43 oz. per sq. ft. It should be noted that a paper weave having over 18 to 20 strands per inch becomes difficult to handle and excessively high pressures are required to force the large strand area into the surface of the moldable parts. Pressures of these magnitudes overdensify the panel and a combination of high strand concentration and resin usage can yield tight surface skins and a blistering problem.

Referring now to the drawing, a luggage shell, generally indicated at 1, is shown. The shell 1 is formed from a flat panel 2 and is composed of a wood fiber and a binder system as noted above.

A fabric material 3 is molded to the interior surface of the shell 1 by the procedure as noted above. This material greatly enhances the strength of the shell 1 and improves formability thereof.

With this invention a distinctive, low-cost finish can be achieved in a one-shot molding process without increasing the press time for the moldable wood fiber mat.

Two important advantages are achieved through the use of fabrics on mat surfaces of this type.

First, the fabric helps to support the fiber mat during the forming steps in the molding process, improving the formability of the fiber mat.

Second, the fabric molded into the part surface increases the strength of the part and facilitates the forming of deep and steep draws as are encountered on the sides of luggage shells. This is particularly notable in these luggage shells where up to 50% increase in impact strength is measured by a standard Beech impact tester on fabric surfaced fiber mat shells over plain fiber mat shells.

While various specific examples of preferred procedure employing the above invention have been described above, it will be apparent that many changes and modifications may be made in those methods of procedure without departing from the spirit of the invention. It should, therefore, be understood that the examples cited and the methods of procedure set forth above are intended to be illustrative only and are not intended to limit the scope of the invention.

What is claimed is:

1. A method of producing reinforced moldable wood fiber mat formed of a resin binder system and a wood fiber, comprising: steaming the fiber mat for a period of 5 to 60 seconds to activate the binder system and plasticize the wood fiber, laying a reinforcing fabric on the steamed fiber mat, and embedding said fabric into said mat by pressing the fabric into the panel at a temperature of 150 to 375° F. and at a pressure of 200 to 1000 p.s.i. for a period of 15 to 180 seconds to consolidate and cure said resin in said mat and to interlock said fabric thereto.

2. A method of producing reinforced moldable wood fiber mat formed of a resin binder system and wood fiber, comprising: spraying a reinforcing fabric with an aqueous solution of resin material, allowing the solution of resin material on the fabric to dry, steaming the fiber mat for a period of 5 to 60 seconds to activate said resin binder system and plasticize the wood fiber, laying the resin treated fabric on the steamed fiber mat, and embedding said fabric into said mat by pressing the fabric into the panel at a temperature of 150 to 375° F. and at a pressure of 200 to 1000 p.s.i. for a period of 15 to 180 seconds to consolidate and cure said resin in said mat and to interlock said fabric thereto.

3. A method of producing reinforced moldable wood fiber mat as set forth in claim 1, wherein said fabric is burlap.

4. A method of producing reinforced moldable wood fiber mat in accordance with claim 1 wherein said fabric is a paper weave.

5. A method of manufacturing a reinforced moldable wood fiber mat formed of a resin binder system and wood fiber, wherein the moldable fiber mat is formed by continuously felting resin treated wood fibers into a thick, low density mat and then continuously predensifying the mat by passing the continuous mat between a pair of rollers, comprising: continuously laying a fabric on the felted mat prior to pre-densification of the moldable mat; steaming the fiber mat and fabric for a period of 5 to 60 seconds to activate the binder system and plasticize the wood fiber; and embedding the fabric into the mat by pressing the steamed moldable mat and fabric in a matched metal die at a temperature of 150 to 375° F. and pressure of 200 to 1000 p.s.i. for 15 to 180 seconds to interlock said fabric thereto and cure the resin binder and consolidate said mat.

6. A method of manufacturing a reinforced moldable wood fiber mat formed of a resin binder system and wood fiber, wherein the moldable fiber mat is formed by continuously felting resin treated wood fibers into a thick, low density mat and then continuously pre-densifying the mat by passing the continuous mat between a pair of rollers, comprising: continuously laying a resin treated fabric on the felted mat prior to pre-densification of the moldable mat; steaming the fiber mat and resin treated fabric for a period of 5 to 60 seconds to activate the binder system and plasticize the wood fiber; and embedding the fabric into the mat by pressing the steamed moldable mat and resin treated fabric in a matched metal die at a temperature of 150 to 375° F. and pressure of 200 to 1000 p.s.i. for 15 to 180 seconds to interlock the fabric thereto and cure the resin binder and consolidate the mat.

References Cited
UNITED STATES PATENTS

| | | | |
|---|---|---|---|
| 3,098,785 | 7/1963 | Meiler | 162—68 |
| 3,121,656 | 2/1964 | Gluck | 161—162 |
| 3,130,114 | 4/1964 | Nagy et al. | 162—68 |
| 2,604,425 | 7/1952 | Batchelor et al. | 188—250 |

MORRIS SUSSMAN, *Primary Examiner.*